United States Patent
Berghoefer et al.

(12)

(10) Patent No.: US 10,713,768 B2
(45) Date of Patent: Jul. 14, 2020

(54) METHODS OF YIELD ASSESSMENT WITH CROP PHOTOMETRY

(71) Applicant: PIONEER HI-BRED INTERNATIONAL, INC., Johnston, IA (US)

(72) Inventors: Chad Clifford Berghoefer, Grimes, IA (US); Travis Allen Hanselman, Winterset, IA (US); Neil J Hausmann, Clive, IA (US); Carlos Messina, Des Moines, IA (US)

(73) Assignee: PIONEER HI-BRED INTERNATIONAL, INC. IA (US)

( * ) Notice: Subject to any disclaimer, the term of this patent is extended or adjusted under 35 U.S.C. 154(b) by 114 days.

(21) Appl. No.: 15/988,739

(22) Filed: May 24, 2018

(65) Prior Publication Data

US 2019/0019281 A1     Jan. 17, 2019

Related U.S. Application Data

(60) Provisional application No. 62/532,498, filed on Jul. 14, 2017.

(51) Int. Cl.
*G06T 7/00* (2017.01)
*H04N 5/232* (2006.01)
(Continued)

(52) U.S. Cl.
CPC ........ *G06T 7/0002* (2013.01); *G06K 9/00671* (2013.01); *G06K 9/3241* (2013.01);
(Continued)

(58) Field of Classification Search
CPC ....... G06T 7/0002; G06T 7/0004; G06T 5/30; G06T 7/194; G06T 2207/30188;
(Continued)

(56) References Cited

U.S. PATENT DOCUMENTS

| 8,073,235 B2 | 12/2011 | Hausmann et al. |
| 8,488,865 B2 | 7/2013 | Hausmann et al. |

(Continued)

FOREIGN PATENT DOCUMENTS

| WO | 2009/023110 A1 | 2/2009 |
| WO | 2012/141778 A1 | 10/2012 |

(Continued)

OTHER PUBLICATIONS

Miller, et al.: "A robust, high-throughput method for computing maize ear, cob, and kernel attributes automatically from images", The Plant Journal, 2017, vol. 89, pp. 169-178.

*Primary Examiner* — Neil R McLean

(57) ABSTRACT

A method of evaluating one or more kernels of an ear of maize using digital imagery that includes acquiring a digital image of the one or more kernels of the ear of maize without the use of spatial reference points, processing the digital image to estimate at least one physical property of the one or more kernels of the ear of maize from the digital image, and evaluating the at least one kernel of maize using the estimate of the at least one physical property of the at least one kernel of maize. The method includes using one or more such digital images to estimate yield on a plant, management zone, field, county and country level.

24 Claims, 6 Drawing Sheets

(51) Int. Cl.
  *G06T 7/194* (2017.01)
  *G06T 5/30* (2006.01)
  *G06K 9/32* (2006.01)
  *G06K 9/00* (2006.01)
(52) U.S. Cl.
  CPC .............. *G06T 5/30* (2013.01); *G06T 7/0004* (2013.01); *G06T 7/194* (2017.01); *H04N 5/23293* (2013.01); *G06K 2209/17* (2013.01); *G06T 2207/10004* (2013.01); *G06T 2207/10016* (2013.01); *G06T 2207/20024* (2013.01); *G06T 2207/30188* (2013.01); *G06T 2207/30242* (2013.01)
(58) Field of Classification Search
  CPC . G06T 2207/10004; G06T 2207/20024; G06T 2207/10016; G06T 2207/30242; G06K 9/00671; G06K 9/3241; G06K 2209/17; H04N 5/23293
  See application file for complete search history.

(56) References Cited

U.S. PATENT DOCUMENTS

| | | | |
|---|---|---|---|
| 9,008,409 | B2 | 4/2015 | Hausmann et al. |
| 2012/0260618 | A1 | 10/2012 | Alley et al. |
| 2016/0217231 | A1* | 7/2016 | Mewes ............... G06F 17/5009 |
| 2016/0225135 | A1* | 8/2016 | Young ...................... G06T 7/11 |
| 2016/0301727 | A1* | 10/2016 | Barjonas ................ H04N 7/147 |
| 2017/0024876 | A1* | 1/2017 | Young .................. G06T 7/0004 |
| 2017/0351790 | A1* | 12/2017 | Farah ..................... G06Q 50/02 |
| 2018/0253600 | A1* | 9/2018 | Ganssle ............. G06K 9/00657 |
| 2018/0373932 | A1* | 12/2018 | Albrecht .................. G06T 7/11 |

FOREIGN PATENT DOCUMENTS

| | | |
|---|---|---|
| WO | 2013/101806 A1 | 7/2013 |
| WO | 2014/100237 A2 | 6/2014 |

* cited by examiner

Type Name: [Type Title Name]
Location Name: [Type Title Name]
Range: [Type Range]
Plot: [Type Plot:]
Population: [32000]

Kernels / bu.: [80000]

Ear Kernels: 542
Yield: 216
[Ave. Yield/Reset] 216

[Cancel] [OK]

*FIG. 4*

METHODS OF YIELD ASSESSMENT WITH CROP PHOTOMETRY

TECHNICAL FIELD

Embodiments of the present disclosure relate to systems and methods for analyzing agricultural crops to determine quantity and quality of the grain, and uses of this information in breeding and yield estimation.

BACKGROUND

There is a need to quickly and accurately assess grain characteristics of growing crops. Methods of photographing and analyzing grain such as corn ears have been developed, but require relatively large and/or specialized equipment.

SUMMARY

A method of evaluating one or more kernels of an ear of maize using digital imagery includes acquiring a digital image of the one or more kernels of the ear of maize, processing the digital image to estimate at least one physical property of the one or more kernels of the ear of maize from the digital image, and evaluating the at least one kernel of maize using the estimate of the at least one physical property of the at least one kernel of maize. The method includes using one or more such digital images to estimate yield on a plant, management zone, field, county and country level.

BRIEF DESCRIPTION OF THE DRAWINGS

The present disclosure is illustrated by way of example, and not by way of limitation, in the figures of the accompanying drawings and in which:

FIG. 4 shows a screen shot of the imaging device reporting a kernel count and predicted yield in bushels per acre.

DEFINITIONS

Figure 1:
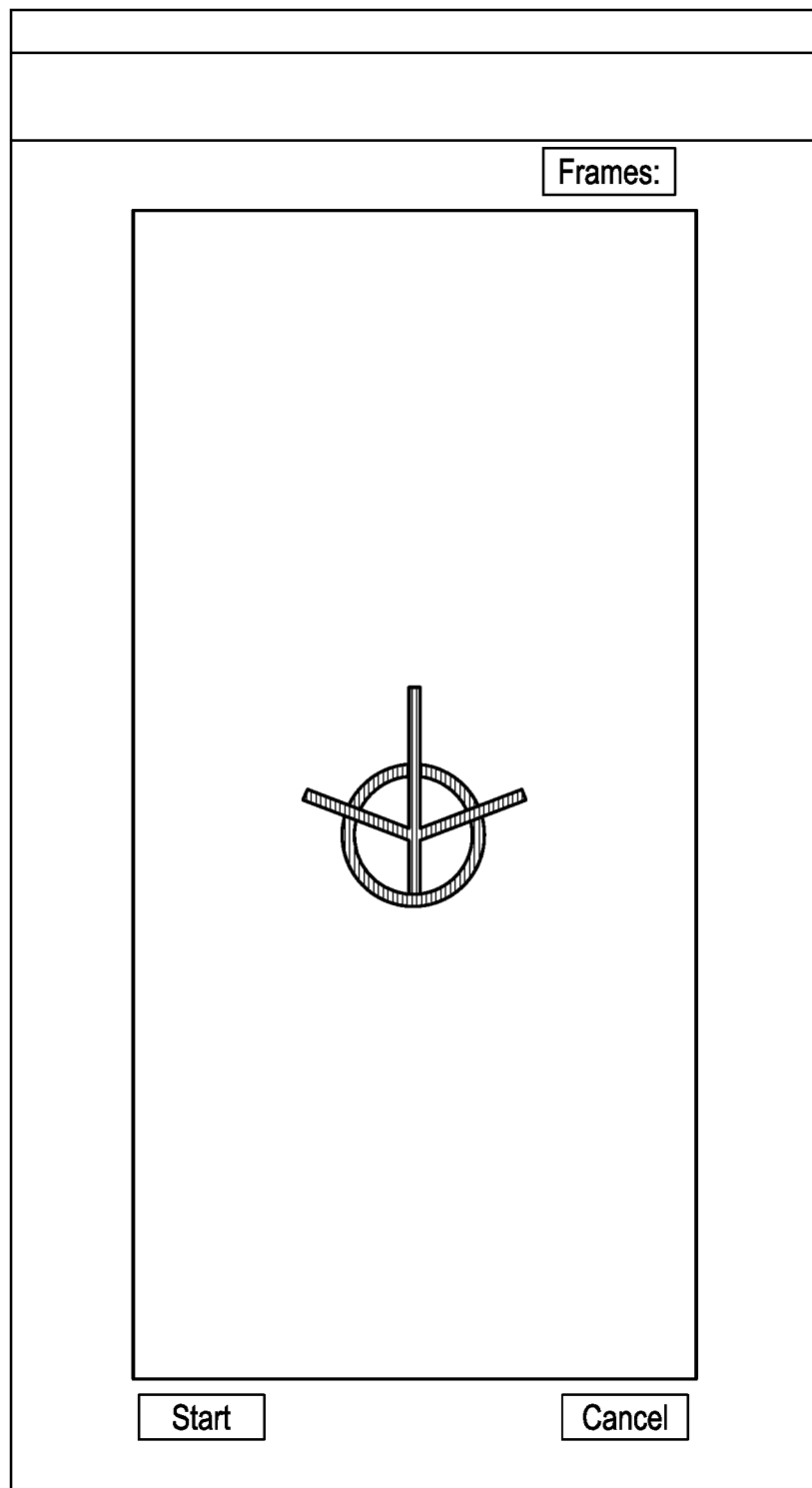
FIG. 1 shows a screen shot of the target window which appears on the imaging device prior to image capture. A target is positioned in the center of the target window to assist with placement of the corn ear.

The term "aerial image" as used herein refers to an image obtained from an aerial source of any type, including but not limited to drone, plane, satellite, balloon, tower, robotic arm or other similar method capable of taking a photo from an elevated camera position that can image a group of several plants at one time.

The term "as-planted" as used herein is used in reference to the data obtained in a connection with the activity of planting seed. When used in reference to determining the number of plants in the field, the as-planted data may be used as a basis for determining the number of plants in the field based on the total amount of seed planted and an estimate of the proportion of seed that has emerged as viable plants.

The term "boundary contour" as used herein refers to the kernels on the outer perimeter of the segmented corn image and on the tip of the ear. These kernels may be smaller, or may appear smaller in the image.

The term "corn ear to target window surface area ratio" refers to the two dimensional image of the corn ear placed in the target window, and refers to the total area of the corn ear relative to the total area of the target window. The total area of each may be measured in pixels.

The term "crop growth model" as used herein refers to a computer model that simulates crop growth according to data such as planting date, emergence, heat units, available water, etc. Any crop growth model may be used, such as APSIM, a publicly available crop growth model created by CSIRO, the State of Queensland and The University of Queensland in Australia, CropSyst, developed by a team at Washington State University, or crop simulators developed by the USDA Crop Systems and Global Change Laboratory.

The term "dilation" means, with respect to image processing, the use of a structuring element (or filter as used herein) to produce a new binary image, with ones in all locations of a structuring elements origin at which the structuring element fits the input image. Dilation has the opposite effect of erosion, and dilation with a small square structuring element adds a layer of pixels to both the inner and outer boundaries of regions.

The term "erosion" means, with respect to image processing, the use of a structuring element (or filter as used herein) to produce a new binary image, with ones in all locations of a structuring elements origin at which the structuring element fits the input image. Erosion with small square structuring elements shrinks an image by removing a pixel layer in both the inner and outer boundaries of regions.

The term "filter" as used herein in the context of image processing refers to what is also referred to as a kernel (as distinguished from a corn kernel), convolution matrix or mask that represents a matrix used as a structuring element. Each pixel of the image may be identified as a point on a matrix. It is positioned at all possible locations in the image and compared with the corresponding neighborhood of pixels. The filter dimensions specify the size of the structuring element, or matrix, in pixels. The filter may be used for sharpening, embossing, edge detection, normalizing (box blur), approximation (Gaussian blur), unsharp masking, and other uses. For a symmetrical filter, such as the box filters described herein, the origin is usually the center element. A filter matrix may be any size or shape matrix.

The term "grain" as used herein is used in reference to the seed produced on a plant. Such grain may be used as seed for breeding or seed production purposes, or as grain for ultimate use as food, feed and/or fuel.

The term "photo burst" refers to a rapid series of still images obtained from an imaging device.

The term "segmentation" or "segmented" refer to the process of isolating an image of an object from the background images in the camera's field of view.

The term "spatial reference point" as used herein refers to an object of known size that is positioned in an image to provide a scale that is used to evaluate the size of other objects in the image. Objects commonly used as spatial reference points include rulers, coins, and trays.

The term "still image" refers to a photograph taken at a single point in time. The term "set of still images" refers to two or more still images, with each image in the set taken at a separate point in time during the same photography or video session.

The term "test weight" refers to a measurement of bulk density, or the weight of a unit volume, of grain (lb/bu). Corn test weight values can range from 45 lbs/bu to over 60 lbs/bu based on variety differences, grain moisture differences or other factors. The USDA established standard test weight of a bushel of corn as 56 lbs/bu based on 15.5% moisture content.

The term "video feed" refers to a series of still images that are obtained when taking a video image. Any one or more of the still images from the video feed may be used in the initial step of the method described below.

DETAILED DESCRIPTION

The method is designed to quantify kernel and ear traits in a high throughput manner. It provides a quick and effective way of estimating yield in a field, and can serve as the basis for correlating aerial images used for yield estimates with actual on the ground crop yield data. Images of immature ears can be coupled with a plant growth model to accurately estimate future yield and to quantitatively assess the rate of grain development. As-planted crop data may also be utilized in conjunction with the photometry data to provide a yield estimate.

Digital imaging and appropriate image processing allow for high throughput quantitative measurement of ear component phenotypes of individual maize plants. Such measurements have various uses in plant breeding applications such as, but not limited to, the study of genetic variation on a plant-to-plant basis. Examples of traits that may be determined from imaging include, without limitation, ear color, kernel color, percent damage resulting from diseases or insects (such as *Fusarium verticilliodes, Diplodia maydis, Ustilago maydis, Agrotis epsilon, Blissus Leucopterus, Agramyza parvicorreis*), kernel starch content, kernel fill pattern (such as regular, irregular or other characterization), kernel texture, within plot variation of any of the previously listed traits, linear slope of kernel distribution, exponential slope of kernel area distribution, critical kernel ring of kernel area distribution, kernel abortion, kernel set, kernel numbers per ear, within-ear carbon partitioning and count of total kernel rings from kernel area distribution. In addition, the images may be used to screen breeding populations for traits such as drought tolerance, disease tolerance and stress tolerance. Measures of within plot variation for the trait or traits of interest may be produced.

To acquire the image, various types of image sensors may be used. The image sensors used may include a charge coupled device (CCD) image sensor, a camera, video camera, color sensor, laser/light beam sensor, ultrasonic sensor, or other type of image sensor. The image sensor may provide for color imaging, and spectral filters may be used. The image sensor may provide for imaging across a spectrum wider than or different from the visible spectrum. The image sensor may be configured to image a single ear, multiple ears, individual kernels or multiple kernels in each frame. One embodiment of this invention is to enable the use of cameras present in cell phones, tablets and wearable electronic devices without calibration of the specific device used.

In one embodiment used for assessing ears of corn, the video frames or photo burst of an ordinary cell phone camera is utilized for initial image capture. A user will husk the corn in the field and the ear is imaged using the camera photo or video feed. A border, referred to herein as a "target window" is automatically positioned on the screen of the device. The user then positions the image of the corn ear so that it is wholly within the target window. This allows for the imaging of the ear without the use of spatial reference points.

Figure 2:
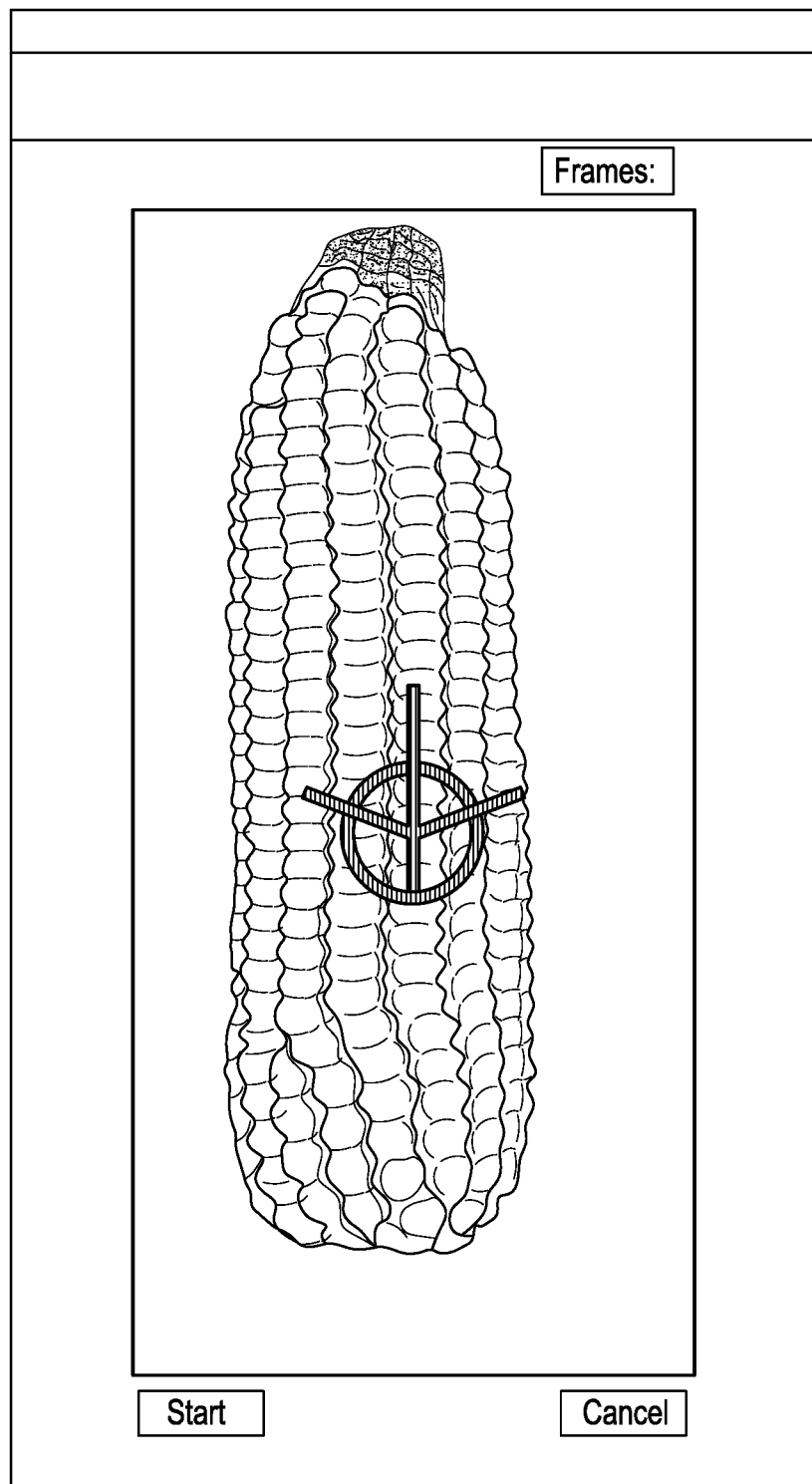
FIG. 2 shows a screen shot of the imaging device indicating that the images of the corn ear have not yet passed quality control parameters and so acceptable images for kernel counting have not yet been obtained.
Figure 3:
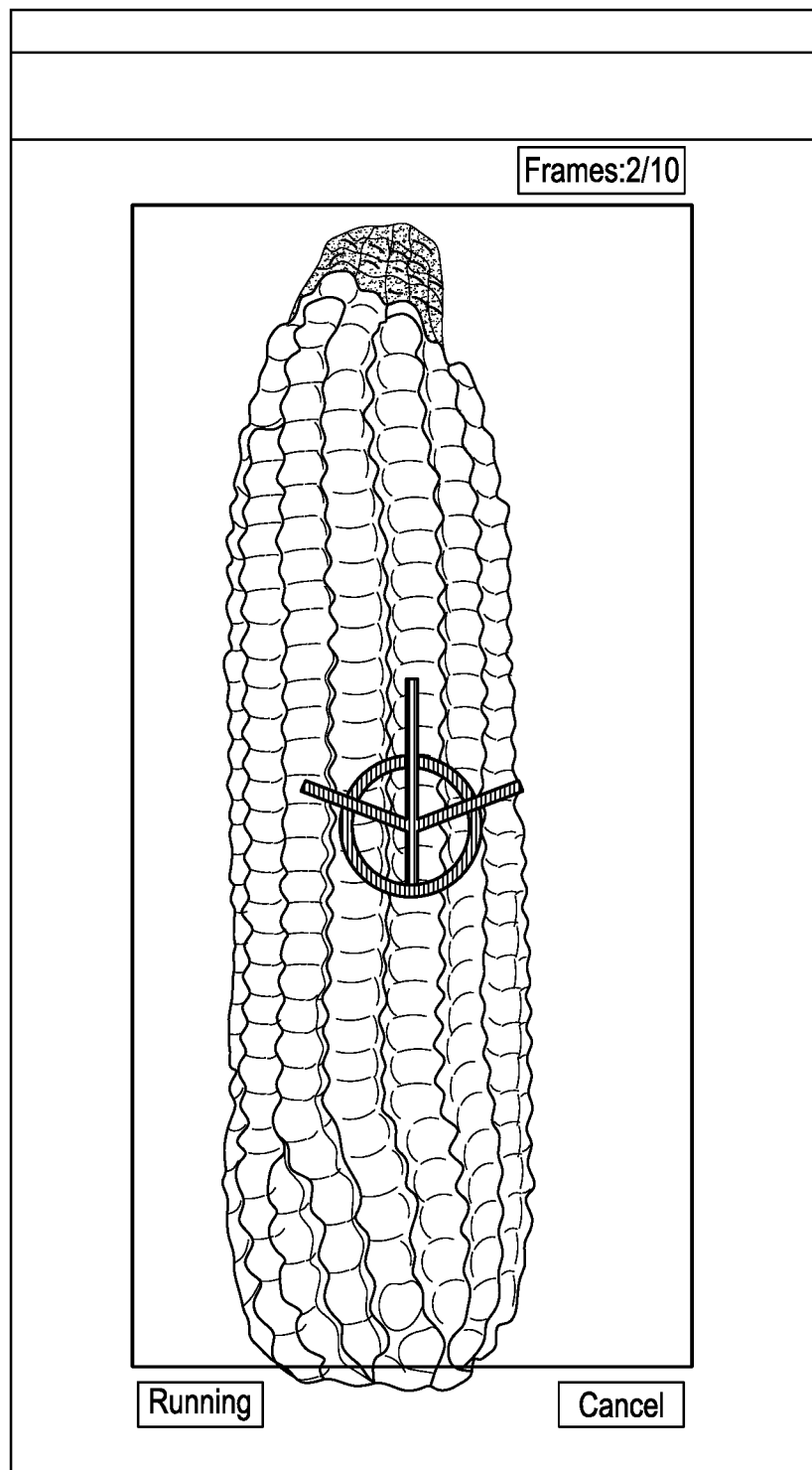
FIG. 3 shows a screen shot of the imaging device indicating that the images of the corn ear have met quality control parameters and that, at that point in time, two acceptable images for kernel counting have been captured. The 2/10 indicates that the method utilized by the phone application has been programmed to require 10 acceptable images.

The images are then processed. The corn ear is digitally separated, such as through image segmentation, from the background noise of husks, cornstalks, leaves, etc. A color threshold is used in hue, saturation and value (HSV) color space, and, in combination with a camshift or other OpenCV training algorithm, yellow colored objects inside the box are identified. Alternatively, a machine learning training set may be used to teach the computer program to identify an ear of corn, in which case the program would then identify the ear of corn (or other crop of interest) and position it within the target window. Regardless of the method selected, the largest object, or a group of objects, is positioned in the target window and selected as a possible corn ear for imaging. The program checks metrics for one or more of placement, target image color (for corn), blurriness, and ratio of corn ear object bounding box size to target box size, and a sample of individual frames of the video feed (a sample of the method using 3, 5, 10 and 20 frames have each been found effective) that pass the quality control metrics are stored or held in memory for additional processing. The algorithm used for the blur metric was provided by Tong et. al, "Blur Detection for Digital Images Using Wavelet Transform" Multimedia and Expo, 2004. ICME '04. (IEEE Conference Jun. 27-30, 2004) (DOI: 10.1109/ICME.2004.1394114). The program will indicate to the user, such as through a message on the screen, when acceptable images have been obtained (See FIG. 2 and FIG. 3).

Other quality control metrics include criteria to confirm that the object of interest (corn ear) occupied more than half of the region of interest window and that the object was fully contained within the region of interest as determined by a point polygon test of the contour. This point polygon test may be accomplished by testing how many times a ray, starting from the point and going in any fixed direction, intersects the edges of the polygon. If the point is on the outside of the polygon, the ray will intersect its edge an even number of times.

One advantage of the method described above is that measurement is done without external props of any kind, such as calibration markers, sizing, controlled background or trays. Previous corn ear photometry work has involved a marker of known size and/or configuration to calculate a spatial reference point used to translate pixels into real units (such as cm or cm2). Controlled conditions with markers were also used to ensure kernel separation and counting. The present method enables the photometry to occur in uncontrolled conditions without external markers because (1) height variation and distance to camera is controlled by the quality control criteria indicated above, and (2) the video frame feed or still image feed is controlled at a fixed resolution so the morphological parameters work consistently based on a fixed matrix window size. In this example the resolution was fixed at 640*480, although other fixed resolutions would work as well.

Following the image generation, a random sample of individual frames (a sample of three has been found effective, although more or less may be used) are processed individually using a graph cut segmentation to separate the yellow corn ear object from the background of plants, soil, husk, hands, sky, tassels, other non-target objects. Once the corn ear is segmented from the background, each of the images is further processed using morphological filtering and automatic local thresholding to coarsely separate individual kernels on the segmented corn ear.

Following coarse ear image processing separation from background, a finer separation of the ear from background is achieved with morphological filtering. The filtering operations applied include a dilation operation with a filter size of about 75% of the bounding box diameter, which connects nearby objects. This is followed by erosion to remove small noise objects, and may use the same filter specification. An additional fixed filter size of 51×51 pixels (or alternative size filters) may be used with a closing filter to connect neighboring blobs and an elliptical shaped or 9×9 pixel filter (or alternative size or shape filter) may be applied as an erosion to remove remaining small noise objects. Further separation of individual kernels on the corn ear for counting also includes morphological filtering. Within the boundary contour of the corn ear, a 3×3 pixel opening filter (erosion followed by dilation) may be applied followed by a 3×3 pixel cross filter applied with erosion. By subtracting the eroded image from the original images, boundaries of each region can be identified. The 3×3 pixel opening filter followed by a 3×3 pixel cross filter applied with erosion resulted in good separation of the kernels on the boundary contour of the corn ear, which kernels appear smaller as a result of being located on the border of the ear in the image. The higher level of resolution obtained with this technique is important for accurate kernel counting and phenotyping. Other similar filter values and techniques, including the use of non-square filter shapes, may be used.

Next, the area of each segmented kernel object is measured and a median area value is calculated. All objects detected are then classified according to the area size as being individual kernels or clusters of kernels. The count of kernels is then estimated from the sum of individual classified kernels and the estimated count of kernels in a cluster based on its area size. A kernel count number is generated for each of the three images and the median value is then multiplied by a "calibration" factor.

This calibration factor was determined based on an analysis of two dimensional photos of corn ears in comparison to the actual number of kernels determined either by actual counting or three dimensional imaging. The calibration factor in a range of 2-3, and more preferable, 2.25-2.5, was found to account for the non-visible kernels not appearing in the image. This resulting value is presented as the kernel count for the sample. Alternatively, or in addition to kernel counting, the area of each segmented kernel in the image may be measured and used as a basis for yield per ear.

If desired, a kernel count, or the median or average kernel count of several images, is then translated to a yield estimate based on a calculation of yield (bu/acre)=(kernels/ear*ears/acre)/(kernels/bushel). Kernels per bushel may be adjusted to account for differences in corn variety kernel size. Alternatively, yield may be calculated based on the actual or predicted test weight of the kernel, which may utilize known information about the variety. Ears per acre is supplied manually by the user or can be fed from a web service. Aerial images, such as by drone or satellite, may be used to determine an estimate of the plant population, total plant biomass, and/or plant health. If a plant population estimate is obtained, variety information may also be used to determine the average number of ears per plant per acre. As-planted data may also be useful either on its own, or in conjunction with the aerial image data, to utilize the number of seeds planted in the field section under analysis to more accurately estimate the plant population that has emerged from those seeds.

Aerial images may be used to count plants in the field. One method involves using ground based visual markers positioned around the border of the field. High accuracy RTK GPS location (lat, long, altitude) for the base of each ground based visual marker may be manually collected in advance of imaging. Drone aircraft equipped with a global positioning system (GPS), and RGB, multispectral, and/or hyperspectral cameras may be used to capture high resolution images of crop rows during the growing season. Each image file is stamped with a single GPS position of the drone when the image is obtained. The images may be stitched together using commercial software, such as Agisoft, known to those of skill in the art. The GPS position stamp may be used by the software to arrange or order the images. The images will then be stitched together by matching pixels of overlapping regions of adjoining images to create a plant data map. The stitched plant data map will be georeferenced and have GPS coordinates for each pixel. The plant data map may then be aligned with the pre-planting grid of the research plot. The visual markers may be used as ground control points (GCP), which can be used to more precisely "fit" the plant data map to the pre-planting grid of the plot. Individual pixels may be converted to "0" for soil or "1" for plant material on the basis of pixel spectral characteristics depending on the timing and canopy coverage in the images. The converted "1"s will be digitally aligned to enable the identification of rows, which may optionally be associated with the pre-planting grid. Plant objects outside of the center row line are identified as weeds and not counted. Once aligned, the software will classify and quantify the plant objects in the row utilizing color, shape, size, brightness and/or spectral characteristics. Alternatively, or in addition, aerial imaging may be used to determine total plant biomass and/or crop health, which measurements may be calibrated with an estimated yield as determined by the methods described herein.

In one embodiment, the ear photometry data is entered into a crop growth model. Ear photometry data may be obtained about as early as three days after silking, or any time thereafter prior to harvest. By entering the photometry data as a feature in the crop growth model, the model can be used to update a predicted yield on the basis of additional factors, such as soil moisture, predicted weather and rate of kernel abortion. Moreover, one or more additional ear photometry measurements may be taken at later days and/or weeks to assess a rate of grain development that can used to project harvest date and/or estimated future yield.

EXAMPLE

Example 1—Kernel Count and Yield Estimation

To estimate kernel count and yield estimation repeatability in the field, two different operators each measured 10 different corn ears twice and the results were recorded. To prepare the corn ears for kernel count sampling, the ear husk was pulled back and the silks were lightly brushed off by hand. The corn ears remained attached to the corn plant and the digital video frames were acquired for processing by extracting 30 still images from a digital camera video feed. Following quality control, three images were selected for segmentation, filtering, local thresholding and counting using the filters described above. Equipment variation was calculated to be 32.8 kernels or 12.35 bu\acre assuming plant population of 32,000 plants/acre and 85,000 kernels/bushel and differences between operators were not significant at an alpha level of 0.05.

Figure 5:
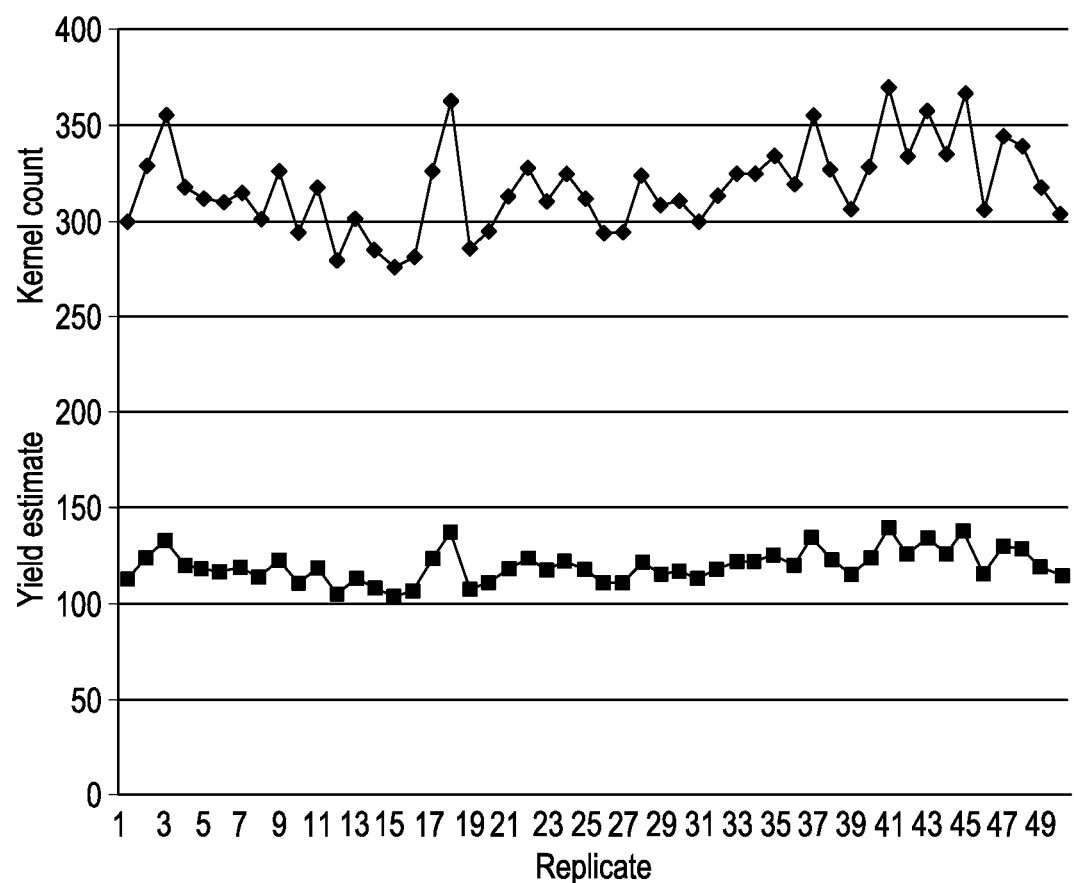
FIG. 5 is a chart showing the correlation between kernel count and predicted yield.
Figure 6:
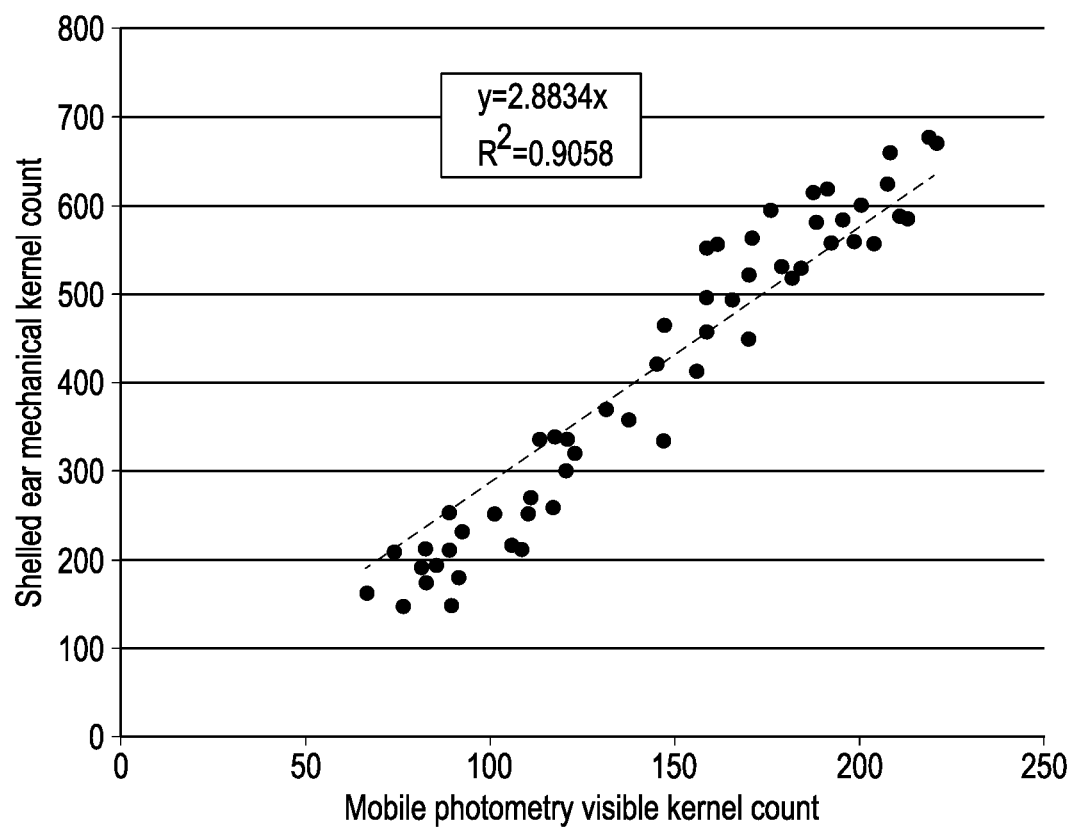
FIG. 6 is a chart comparing the accuracy of the current method to an automated kernel counting device.

FIG. 5 shows a repeated measurement of kernel count and yield estimate from a single corn ear sample measured 50 times. The yield estimate was calculated using the measured kernel count and a fixed population value of 32,000 plants per acre and 85,000 kernels per bushel. The kernel count range was 93 kernels and the yield estimate range between the lowest and highest yield estimates was 35 bushels per acre.

Although the methods described herein have been primarily described with respect to corn seed imaging, the methods can be used for other agricultural crops, such as sorghum, wheat, rice, soybean, canola and cotton. Sorghum is structurally similar to corn, and the method may be used in a very similar manner for such crop. In other crops, the image will be taken of the panicle, seed pod, or opened seed pod instead of the husked ear. The method, when used with images taken of seed pods on the plant, can base the seed count and/or yield estimate on pod length and pod width.

What is claimed is:

1. A method of predicting total yield of a corn crop, comprising:
    obtaining a plurality of images of an ear of corn without the use of spatial reference points, wherein the images comprise a target window and the corn ear is positioned within the target window such that the corn ear to target window surface area ratio is between 70% to 90%,
    processing the plurality of images with a computer program to determine the total number of kernels per ear, wherein the computer program determines the total number of kernels per ear by multiplying the mean or median number of visible kernels obtained from the plurality of images by a calibration factor,
    obtaining an estimate of the number of ears or kernels per acre with the computer program,
    calculating predicted total yield with the computer program based upon the total number of kernels per ear determined by the computer program and the estimate of the number of ears or kernels per acre obtained by the computer program, and
    automatically displaying the predicted total yield to a user of the computer program.

2. The method of claim 1, wherein the plurality of images are still images from a video feed of the corn ear.

3. The method of claim 1, wherein the corn kernels on the corn ear are segmented and counted.

4. The method of claim 1, wherein the number of kernels per ear is the median number of kernels from a set of still images.

5. The method of claim 4, wherein the image is a two dimensional image and the total number of kernels per ear is obtained by multiplying the number of kernels visible in the image by a calibration factor within the range of 2.25 to 2.50.

6. The method of claim 1, wherein the predicted total yield is calculated based on an estimate of the ears per acre, which ears per acre estimate is based on the predicted test weight, yield or number of ears per plant of the variety based on one or more of variety differences, prior season data, or rainfall or crop moisture data.

7. The method of claim 1, wherein the predicted total yield is calculated based on an estimate of the number of ears per acre, which ears per acre estimate is based on as-planted data.

8. The method of claim 1, wherein the predicted total yield is calculated based on an estimate of the number of ears per acre, which ears per acre estimated is based on an estimate of the plants in an aerial image.

9. The method of claim 1, wherein the predicted total yield is used to correlate the plant biomass or crop health obtained from one or more aerial images.

10. The method of claim 1, wherein processing the plurality of images comprises applying, to each image, an opening filter followed by a cross filter applied with erosion.

11. The method of claim 1, wherein the plurality of images comprise at least three still images of each corn ear.

12. A method of predicting crop yields, comprising:
    obtaining one or more images of grain from a plant growing in a field, wherein the one or more images of grain are obtained by positioning the grain within a target window on the viewing screen of an imaging device, and images are selected based on having a grain to target window surface area ratio between 70% to 90%,
    analyzing the first image to determine the number of individual grains,
    entering the number of individual grains into a crop growth model, and
    using the crop growth model to calculate an estimated yield of the growing plant at harvest.

13. The method of claim 12, wherein the crop is corn.

14. The method of claim 13, wherein the corn ear is imaged by
    obtaining a set of still images of the corn ear,
    segmenting the corn ear from the background from at least two images in the set of still images,
    applying a series of filters to each image,
    counting the number of kernels, and
    calculating total yield based on the kernel count.

15. The method of claim 14, wherein applying a series of filters to each image comprises applying an opening filter followed by a cross filter applied with erosion.

16. The method of claim 12, wherein at least a first and second set of images are obtained at least one day apart, and the crop growth model updates the predicted crop yield based on a projected rate of kernel abortion.

17. A method of predicting total yield of a corn crop, comprising:
    obtaining one or more images of an ear of corn without the use of spatial reference points wherein the one or more images are selected based on having a corn ear to target window surface area ratio between 70% to 90% within a target window on the viewing screen of an imaging device,
    processing the one or more images with a computer program to determine the total number of kernels per ear, wherein the computer program determines the total number of kernels per ear by segmenting and counting the number of kernels in one or more images and multiplying the number of kernels by a calibration factor,
    obtaining an estimate of the number of ears or kernels per acre with the computer program,
    calculating predicted total yield with the computer program based upon the total number of kernels per ear determined by the computer program and the estimate of the number of ears or kernels per acre obtained by the computer program, and
    automatically displaying the predicted total yield to a user of the computer program.

18. The method of claim 17, wherein the one or more images are obtained by positioning the corn ear within a target window on the viewing screen of an imaging device.

19. The method of claim 17, wherein the calibration factor is within the range of 2.25 to 2.50.

20. The method of claim 17, wherein the predicted total yield is calculated based on an estimate of the ears per acre, which ears per acre estimate is based on the predicted test weight, yield or number of ears per plant of the variety based on one or more of variety differences, prior season data, or rainfall or crop moisture data.

21. The method of claim 17, wherein the predicted total yield is calculated based on an estimate of the number of ears per acre, which ears per acre estimate is based on as-planted data.

22. The method of claim 17, wherein the predicted total yield is calculated based on an estimate of the number of ears per acre, which ears per acre estimated is based on an estimate of the plants in an aerial image.

23. The method of claim 17, wherein the predicted total yield is used to correlate the plant biomass or crop health obtained from one or more aerial images.

24. The method of claim 17, wherein processing the plurality of images comprises applying, to each image, an opening filter followed by a cross filter applied with erosion.

* * * * *